United States Patent [19]
Ake

[11] Patent Number: 5,486,690
[45] Date of Patent: Jan. 23, 1996

[54] METHOD AND APPARATUS FOR DETECTING LASER LIGHT

[75] Inventor: DuWain K. Ake, Tipp City, Ohio

[73] Assignee: Apache Technologies, Inc., Dayton, Ohio

[21] Appl. No.: 297,116

[22] Filed: Aug. 29, 1994

[51] Int. Cl.$^6$ .............................. H01J 40/14; G01C 3/08
[52] U.S. Cl. ...................... 250/206.1; 250/208.6; 356/3.16; 356/141.3
[58] Field of Search .............................. 250/206.1, 208.6, 250/214 R, 551; 356/3.16, 4.08, 139.04, 139.05, 139.1, 141.3, 141.4

[56] References Cited

U.S. PATENT DOCUMENTS

| | | | |
|---|---|---|---|
| 3,649,122 | 3/1972 | Holtz | 356/4.01 |
| 4,062,634 | 12/1977 | Rando et al. | 356/149 |
| 4,240,208 | 12/1980 | Pehrson | 356/400 |
| 4,676,634 | 6/1987 | Petersen | 356/4 |
| 4,732,471 | 3/1988 | Cain et al. | 356/400 |
| 4,830,489 | 5/1989 | Cain et al. | 356/73 |
| 4,907,874 | 3/1990 | Ake | 356/401 |
| 4,976,538 | 12/1990 | Ake | 356/401 |
| 5,000,564 | 3/1991 | Ake | 356/1 |

Primary Examiner—Stephone B. Allen
Attorney, Agent, or Firm—Frost & Jacobs

[57] ABSTRACT

A laser light detector is provided which can be used to detect pulsed laser light that is produced by a rotating laser light source on a construction job site. The laser light detector provides an easily-read display which is indicative of the present level or elevation of the laser light detector with respect to the plane of rotating laser light. The laser light detector has a very large dynamic range, while maintaining a very good signal-to-noise ratio, and can, therefore, be used at both short and long distances from the rotating laser light source. The laser light detector is not dependent upon the energy level received of laser light, or by the spot size of laser light as it reaches the light detectors. The laser light detector is available with several options, including dead band adjustment and audible indication of the elevation.

10 Claims, 8 Drawing Sheets

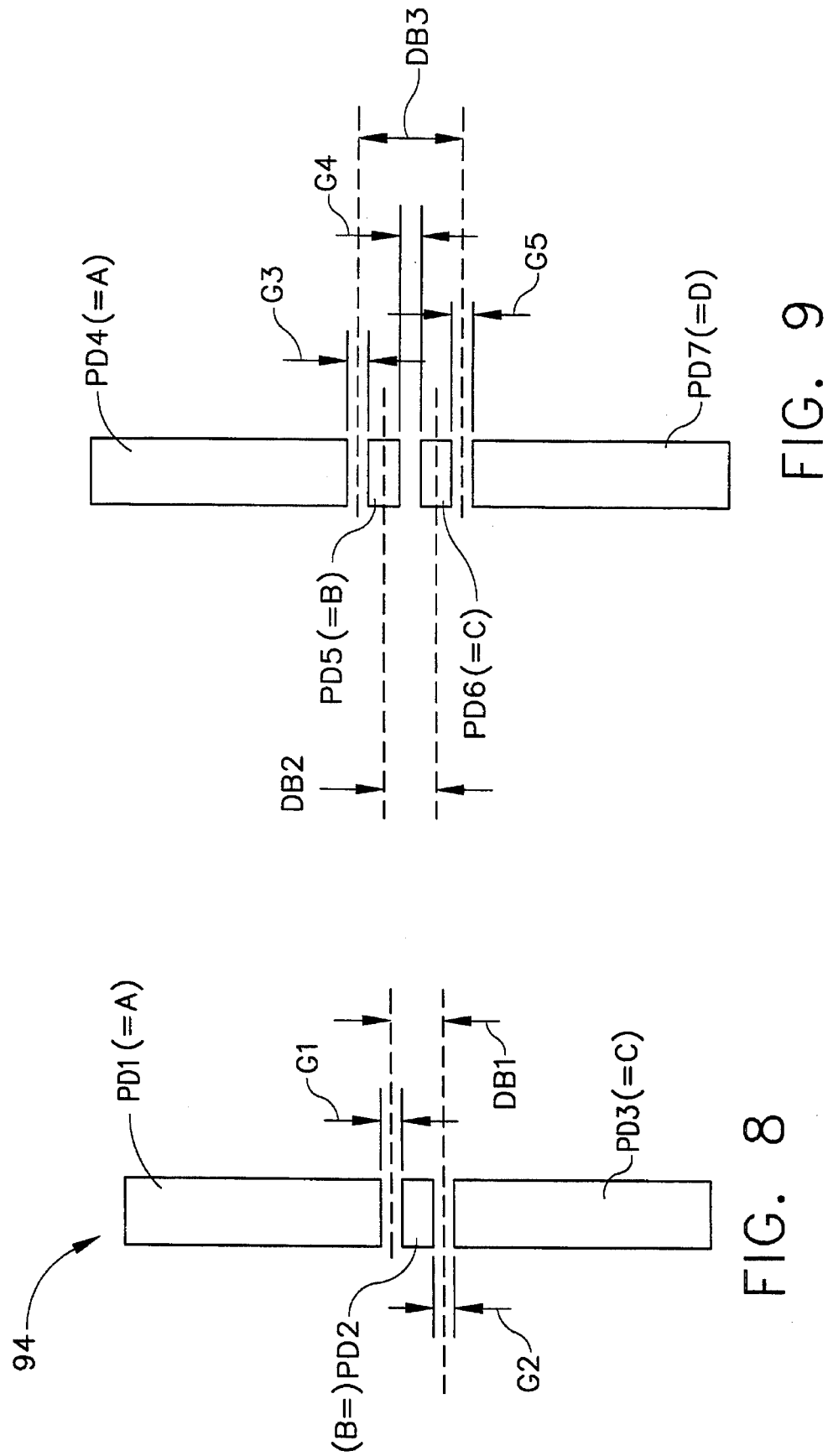

METHOD AND APPARATUS FOR DETECTING LASER LIGHT

TECHNICAL FIELD

The present invention relates generally to light sensing equipment and is particularly directed to detecting pulsed laser light of the type which is used on construction sites to detect the equipment elevation with respect to a plane of laser light created by a rotating laser source. The invention will be specifically disclosed as an elevation detector which provides an equipment operator with the current elevation status, as being, for example, too "high," "on grade," or too "low" with respect to the plane of laser light.

BACKGROUND OF THE INVENTION

Laser light detectors have been available in the past for use in precisely determining the proper elevation on construction job sites. The standard method for using such detectors is to mount a rotating laser light source at a particular elevation on a construction job site, then mount the laser light detector on a piece of equipment (such as on the blade of a bulldozer) to let the operator of the equipment know precisely the elevation of the equipment while the it is in use. For example, the laser light detector could be mounted on a pole attached to the blade of a bulldozer, so the operator of the bulldozer could keep the blade at the correct position while grading the land to the precise elevation desired.

To be most effective, a laser light detector would have an easily viewable display that gives the elevation indication to a person who is sited a few feet from the detector. In addition, a detector used on a machine would normally have some type of photodiode or other photo-sensitive device on all four corners of the detector's enclosure, so that it could detect laser light coming from any direction. Typical laser light detectors must operate within a one hundred millisecond cycle time, since most rotating laser light sources rotate at 600 rpm.

Typical laser sources used as rotating laser light sources operate in either the infrared or red light frequency spectrum. For example, infrared laser diodes operating at 780 nm are commonly used, as well as red light helium-neon gas lasers, operating at 633 nm. The laser light is typically collimated. Various rotating laser light sources are available having beam sizes from as small as one-quarter inch in diameter to as large as three-quarter inches in diameter.

Laser light detectors are typically available in two types of models: a "machine control receiver" and a "hand-held receiver". The machine control receiver is typically mounted on a piece of equipment, such as a bulldozer, and used in the manner discussed above. The hand-held receiver is typically a smaller device which can be carried by a typical construction worker to be used to detect the elevation of locations at a moment's notice.

A typical hand-held receiver would have a single light-sensitive array having at least two photodiodes arranged in a vertical linear manner. As an alternative configuration, the photodiodes could be arranged in a split-cell geometry, as disclosed in U.S. Pat. No. 4,676,634 (by Petersen), or some other type of photodetector geometry. Examples of other photodetector geometries are provided in U.S. Pat. No. 4,907,874 (by Ake) which includes groups of interdigitated photodetector elements positioned adjacent to each other, by U.S. Pat. No. 4,976,538 (by Ake) which also uses interdigitated photodetector elements having a zig-zag shape to make the sensor less sensitive to being partially shaded from the laser light source. These patents primarily describe various photodetector geometries that are used to maximize the consistency of operation of the detector under varying conditions of laser spot size, image energy distribution, and overall power.

One problem of the conventional laser-light receivers is their use of inductors at the photodetector elements to limit noise from sunlight. The inductors are rather expensive electrical components and it would be desirous to eliminate them from a circuit design that could perform the same laser light detection function. Another problem of conventional peak detecting laser light detectors, as disclosed in the above-identified patents, is that as system noise increases, their signal-to-noise ratio decreases. In fact, if the noise increases substantially to the point where it swamps out the signal, then the signal-to-noise ratio becomes nearly equal to or less than 1.0. This problem is exacerbated when weather effects are added to the problem, which causes the signal-to-noise ratio to even decrease further.

Another problem in conventional hand-held receivers exists in units that have "Butt cells" configurations, which are rectangular photocells arranged end to end. This configuration enables the use of inexpensive standard photocells, and works very well for purely null sensing applications (detecting the beam at the exact center of the cells). However, if it is desired to detect when the laser beam is within a specific distance of the center of the cells, then this specific distance requires a position tolerance typically called the "dead band." Using the Butt cell configuration, the dead band will vary as the laser spot size changes and as the image energy distribution of the laser spot changes. These are very undesirable characteristics, since it is desirable for the dead band to be consistent for all types and sizes of laser beams.

Some of the other conventional photocell configurations use a series of ratiometric photocells (see the Petersen and Ake patents) that consist of two triangularly-shaped photocells arranged opposite each other, as in a tall rectangle with a diagonal line from corner-to-corner creating two rectangular regions (or their optical equivalents). These configurations can produce very consistent dead bands, however, they require a very large custom photocell which is typically very expensive to manufacture.

SUMMARY OF THE INVENTION

Accordingly, it is a primary object of the present invention to provide a laser light detector that overcomes the prior art problems of poor signal-to-noise ratio and performance variations due to dependence upon the energy level received, or due to varying beam size of a rotating laser light source.

It is another object of the present invention to provide a laser light detector which has a very high dynamic range so that it can reliably indicate the proper elevation while located throughout various distances from the rotating laser light source while accommodating variations in spot size, wavelength, output power, and energy distribution of the rotating laser light source.

It is a further object of the present invention to provide a laser light detector which provides a very consistent dead band for all types and sizes of laser beams by converting a dead band sensing application into a null sensing application.

It is yet another object of the present invention to provide a laser light detector which eliminates inductors from the circuit which are used by conventional systems to reduce or eliminate the effects of sunlight on the photocells.

Additional objects, advantages and other novel features of the invention will be set forth in part in the description that follows and in part will become apparent to those skilled in the art upon examination of the following or may be learned with the practice of the invention.

To achieve the foregoing and other objects, and in accordance with one aspect of the present invention, an improved laser light detector is provided having a very good signal-to-noise ratio which allows for stable and more accurate operation by use of an integrator circuit which reduces the average noise signal to a zero, or near-zero, value. The integrator circuit allows the improved laser light detector to have a very large dynamic range to allow its use at various distances from a rotating laser light source. The large dynamic range is accomplished by integrating the instantaneous power of each received light pulse, after it has been converted into a voltage magnitude thereby determining the total energy of the light pulse, and by using an automatic gain control circuit to allow the laser light detector to operate with either very short light pulse widths (when the detector is located at large distances from the rotating laser light source), or with very long light pulse widths (for when the detector is positioned very close to the laser light source). The automatic gain control circuit ensures that the signal values derived from the integrator circuit are always in a useful dynamic range of signal strength (and not saturated) under all operating conditions.

The improved laser light detector is provided with resistors that substitute for the inductors normally used in conventional detectors. The resistors are used with amplifiers having extremely low input impedance so that the resistors do not shunt away the signal current as well as the solar current. Current feedback amplifiers are used in a closed loop configuration to achieve this very low input impedance. In this configuration, the input impedance of the amplifier is reduced by the loop gain of the amplifier, thereby arriving at an input impedance value that is much less than one $\Omega$ (ohm). The overall gain of the amplifier is controlled by a single feedback resistor, which provides very good gain control over all conditions of temperature.

The improved laser light detector is provided with a photocell arrangement in which two large rectangular photocells are combined with one very small rectangular photocell that is centered between the two large photocells. The overall function of the improved laser light detector circuit converts the typical dead band sensing application into a null sensing application by alternately switching the center small photocell into the circuit of the two large photocells, one at a time. In this way, the upper edge of the dead band is defined as the center of the gap between the upper (large) photocell and the center (small) photocell. Likewise, the lower dead band edge is defined as the center of the gap between the center (small) photocell and the lower (large) photocell. Any time the center of the beam is within the upper and lower dead band edges, then the improved laser light detector will indicate an "ongrade" condition. By using two electronic switches, the center photocell is alternately connected in parallel to the upper photocell, and then the lower photocell. This switching action occurs after each strike of the rotating laser light source against the receiver of the improved laser light detector. If the center of the laser beam is above the upper dead band edge, then the improved laser light detector displays a "below grade" condition, and if the center of the laser beam is below the lower dead band edge, then an "above grade" condition is indicated. The "on-grade" condition is indicated if the center of the laser beam is below the upper dead band edge and above the lower dead band edge. By utilizing a null sensing function, the improved laser light detector is able to optically detect the dead band edges with the greatest accuracy known, independent of beam size and energy distribution, while avoiding the high cost of a custom photocell.

The improved laser light detector can be equipped with various enhancements or options, such as the use of two small center cells to accommodate more than one dead band specification for various applications in the field. Another option would be to provide a separate input channel for the center photocell, so that the improved laser light detector does not have to wait for two laser strikes to occur before being updated with new information. This would be particularly useful if the improved laser light detector were mounted on a bulldozer, so that it could directly control the hydraulics of the bulldozer at a faster rate. Another option could be to use one of the more expensive split cells or chevron cells, in situations where that would be desirable.

Many other options could be utilized with the improved laser light detector, such as using comparators instead of analog-to-digital convertors, digital logic instead of a microprocessor, machine power instead of batteries (when mounted on a bulldozer, for example), or different input amplifier configurations.

Still other objects of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

FIG. 8 is a diagrammatic view of a preferred photocell configuration used in the laser light detector of FIG. 1.

FIG. 9 is a diagrammatic view of an alternative photocell configuration used in an optional dead band laser light detector.

DETAILED DESCRIPTION OF THE PREFERRED EMBODIMENT

Reference will now be made in detail to the present preferred embodiment of the invention, an example of which is illustrated in the accompanying drawings, wherein like numerals indicate the same elements throughout the views.

Figure 1:
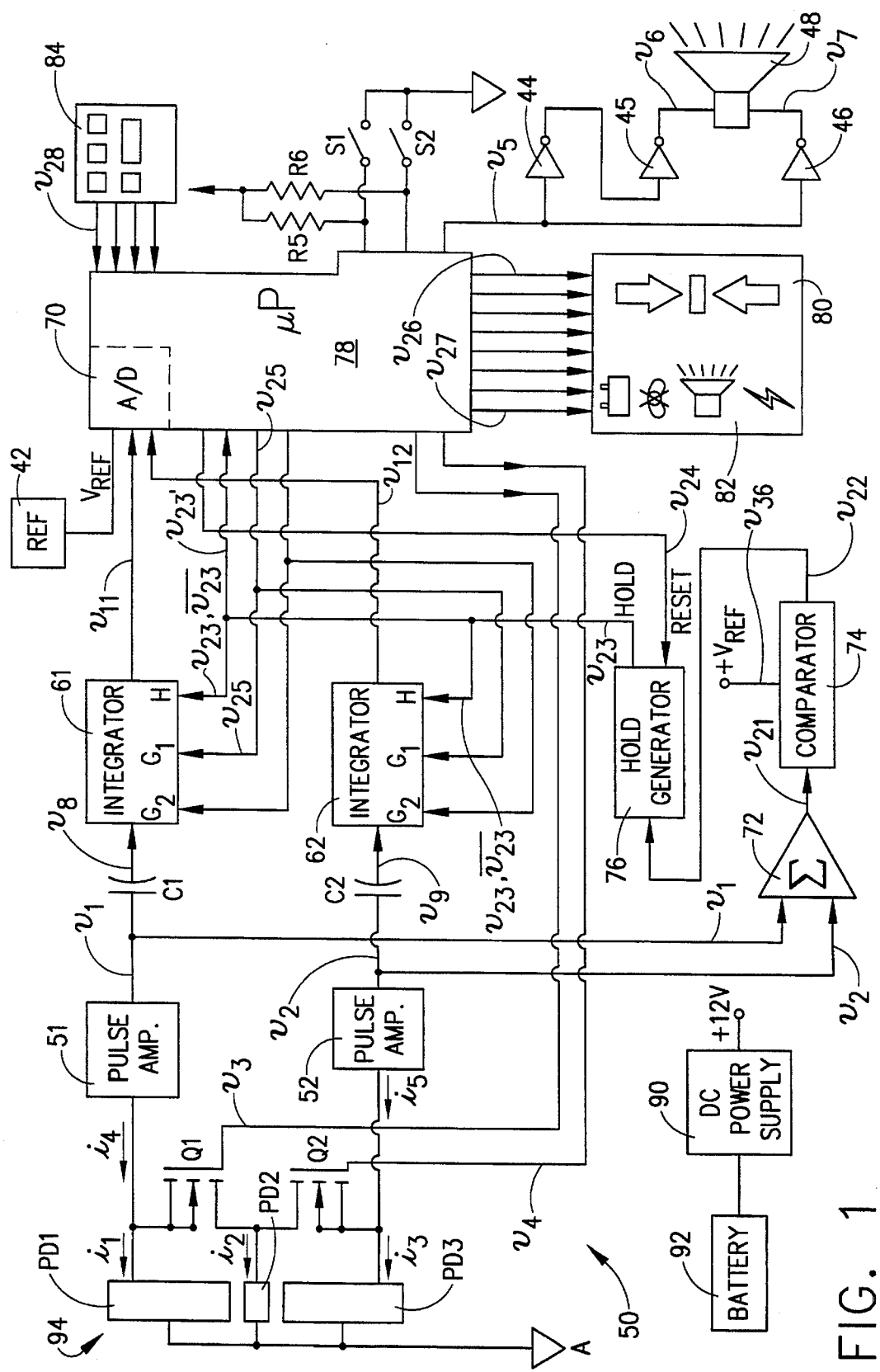
FIG. 1 is a block diagram of a laser light detector constructed in accordance with the principles of the present invention.

Referring now to the drawings, FIG. 1 depicts a block diagram of the entire laser light detector 50 of the present invention, having three photo-detectors as input sensors that are combined into two channels, appropriate amplifiers and other signal conditioning, and at least two display outputs driving an elevation display and a status display. In the illustrated embodiment of FIG. 1, two of the photocells PD1 and PD3 are much larger in surface area than the center photocell PD2, and these three photocells make up a photodiode array 94. The three photocells are connected to transistors Q1 and Q2, which are field-effect transistors that can switch the current path $i_2$ produced by photocell PD2 to be in parallel with either the current path $i_1$ produced by photocell PD1 or the current path $i_3$ produced by photocell PD3. The switching of transistors Q1 and Q2 is controlled by voltage signals depicted by the voltages $v_3$ and $v_4$. Transistors Q1 and Q2 are preferably mounted on the same substrate, thereby making it possible for a single integrated circuit chip to contain both transistors. The preferred integrated circuit for this purpose is available as part number SI9956DY, manufactured by Siliconix Inc., located in Santa Clara, Calif.

The resultant currents, designated $i_4$ and $i_5$, are then amplified by individual pulse amplifiers 51 and 52, which produce output voltages $v_1$ and $v_2$, respectively, which in turn are integrated by pulse integrator and automatic gain control circuit 61 and 62, respectively. Two analog voltages $v_{11}$ and $v_{12}$, respectively, are produced by the output of integrators 61 and 62, and these voltages have a magnitude which is proportional both to the intensity of the laser light striking the photocells PD1, PD2, and/or PD3 and to the time duration during which the light was striking those photodiodes.

The preferred physical layout of the photocells of photodiode array 94 is depicted in FIG. 8 in which photocell PD1 is positioned directly above the smaller central photocell PD2, which in turn is positioned directly above another large photocell PD3, such that all three photocells are positioned and having a center line that is a vertical line. Each photocell is preferably a silicon photodiode, and the length and width dimensions of photocells PD1 and PD3 are preferably 0.2 inches (5.1 mm) by 0.8 inches (20.3 mm). As can be seen in FIG. 8, the longer dimension of photo diodes PD1 and PD3 is preferably in the vertical direction. The central photo diode PD2 preferably has the dimensions of 0.1 inches (2.5 mm) by 0.2 inches (5.1 mm), and is precisely positioned so that a gap is formed between its upper edge and the lower edge of photocell PD1 (as illustrated in FIG. 8 by the gap G1), and also has a precise gap between its lower edge and the upper edge of photocell PD3 (as indicated by the gap G2). The preferred sizes for photocells PD1 and PD3 are determined in view of the range of laser light spot sizes typically found on construction jobsites. Various rotating laser light sources are available in the industry, and they range from spot sizes at their source of ¼ inch (6.3 mm) to ¾ inch (19.0 mm). The smaller laser spot sizes tend to diverge more as their distance increases from the source.

The preferred dimension of gaps G1 and G2 is in the range between 0.025 inches (0.6 mm) and 0.050 inches (1.3 mm). In many laser light sensing applications, the preferred dead band is 0.125 inches (3.2 mm), and to achieve that dead band specification, the preferred gaps G1 and G2 each should be set to 0.025 inches (6.3 mm). If a larger dead band is preferred for a particular application, then the gaps G1 and G2 simply can be made larger, however, it should be noted that gaps G1 and G2 should not be allowed to become excessively large, because repeatability could be sacrificed, so to achieve a larger dead band, the size of the photocell PD2 itself could be increased along its vertical dimension.

In the construction industry, the typical dead band consistency is preferably ±1/16 inch (1.6 mm), which is sufficient for the accurate placement of a mark against a wall in the building being constructed. As can be seen from the above paragraph, the preferred dead band of 0.125 inches precisely follows the preferred dead band of ±1/16 inch. Using conventional optical sensing techniques, a null sensing application can easily be performed by two photocells mounted adjacent to one another and having a gap of between 0.025 inches and 0.05 inches (6.3 mm and 1.3 mm, respectively). The overall repeatability (or accuracy) of laser light detector 50 is about 0.005 inches (0.13 mm) per dead band edge, and since there are two such dead band edges, the total repeatability is approximately 0.01 inches (0.25 mm).

To detect when a light spot is directly centered over this gap (which is the technique for sensing this null position), the amount of light striking the upper photocell is compared to the amount of light striking the lower photocell, and if the amounts are equal, the transfer function defined by the equation $(A-B) \div (A+B)$ will have the value of zero when the beam is truly positioned directly on the null gap. In this transfer function, the symbol "A" represents the amount of power of the light beam striking the upper photocell and the symbol "B" represents the amount of power of light striking the lower photocell. This transfer function can have values in the range of −1 to +1, and the typical null-sensing application is looking to determine when the transfer function's value is equal to zero. The accuracy of this null measurement is achievable to as small a value as 0.005 inches (0.13 mm), which is why it is said that the null-sensing technique is the most accurate of all optical-type position sensing.

The electronic circuit of laser light detector 50 is preferably designed to switch the current $i_2$ that is created by photocell PD2 so that it is combined with either current $i_1$ or $i_3$ by use of switching transistors Q1 and Q2. In a typical application using laser light detector 50, a rotating laser (not shown) is positioned on a construction jobsite at a particular elevation. A plane of rotating laser light is generated by this rotating laser, and laser light detector 50 is positioned within that plane of laser light so that it will be able to detect the laser light when such light strikes its photodiode array 94. Laser light detector 50 can be carried by a human hand so that it can be precisely positioned at any point within the construction job site, or it can be attached to a particular piece of construction equipment such a bulldozer.

Transistor Q1 is switched into its conducting state before one of the laser light sweeps impacts against photodiode array 94, and therefore current $i_1$ and current $i_2$ are combined into a single larger current $i_4$, which is essentially the sum current produced by photocells PD1 and PD2. If the energy received by the three photocells of photodiode array 94 are given the designations "A" for photocell PD1, "B" for photocell PD2, and "C" for photocell PD3, then the transfer function for this first sweep of laser light is equal to [(A+B)−C]÷(A+B+C). After the first sweep occurs, transistor Q1 is switched off and transistor Q2 is switched on (into its conducting state), and the current $i_2$ produced by photocell PD2 is combined with $i_3$ to form a new current $i_5$, which is the combined current produced by photocells PD2 and PD3. This configuration will remain in place until a second sweep of laser light impacts photodiode array 94, at which time a new transfer function for this nulldetecting application will be [A−(B+C)]÷(A+B+C). After the second sweep occurs, then the transistors are switched again so that laser light detector 50 goes back to the first transfer function related above.

During the first sweep of laser light, laser light detector 50 can determine whether or not the center of the laser light spot is above or below (or directly at) the lower gap G2. During the second sweep, laser light detector 50 can determine whether or not the center of the laser light spot is above or below (or directly at) the upper gap G1. It is, therefore, quite easy for laser light detector 50 to determine whether or not the center of the laser light spot was within the dead band designated "DB1" on FIG. 8, which has been defined as the distance between gaps G1 and G2. It will be understood that the upper and lower edges of this dead band are equal to the centerlines of gaps G1 and G2, respectively. Laser light detector 50 can easily make this determination so long as its circuitry can compensate for variations of laser spot size, energy distribution, and overall power, and these obstacles are overcome by the circuitry described hereinbelow.

Figure 6:
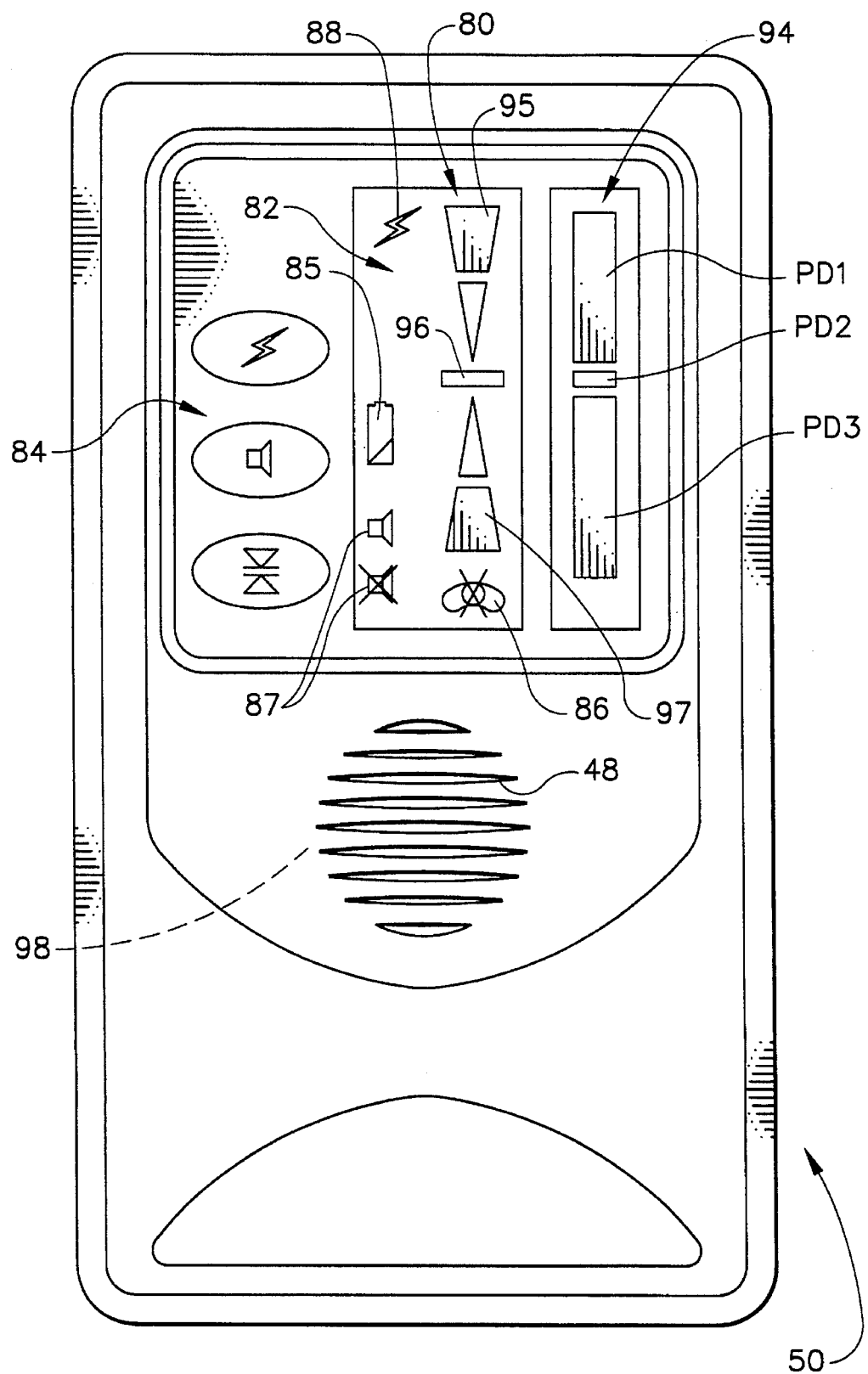
FIG. 6 is an elevational from view of the laser light detector of FIG. 1.

The physical layout of a preferred embodiment of laser light detector 50 is depicted in FIG. 6. In the illustrated embodiment of FIG. 6, photodiode array 94, which contains the three photocells PD1, PD2, and PD3, is located at an upper, exposed area of the front surface of Laser light detector 50, which is physically small enough that it is portable and can be easily held by the human hand in a position to receive the rotating laser light upon its front surface. It will be understood that further photodiode arrays could be located on other surfaces of laser light detector 50 if desirable.

An LCD (liquid crystal display) 80 is provided on laser light detector 50 that contains an above grade indicator 95, and on-grade indicator 96, and a below grade indicator 97. As related above, if the center of the laser beam spot strikes photodiode array 94 below upper dead band edge G1 and above lower dead band edge G2, then the on-grade indicator 96 will be illuminated. On the other hand, if the center of the laser light spot is striking photodiode array 94 above the upper dead band edge G1, then the below grade indicator 97 will be illuminated, and if the center of the laser light spot strikes photodiode array 94 below the lower gap G2, then the above grade indicator 95 will be illuminated.

Laser light detector 50 also includes a liquid crystal display 82 that indicates various optional settings chosen by the set-up operator of the equipment. Liquid crystal display 82 can indicate the battery condition, using the symbol indicated by index numeral 85, display a warning that the transmitter of the laser light is not level, using the symbol indicated by index numeral 86, and display whether the audio speaker is turned on or off, using the symbol designated by index numeral 87. A keypad 84 is used to select the various optional settings available in laser light detector 50. It will be understood that many other symbols could be added to liquid crystal display 82 for indicating other information.

Figure 2:
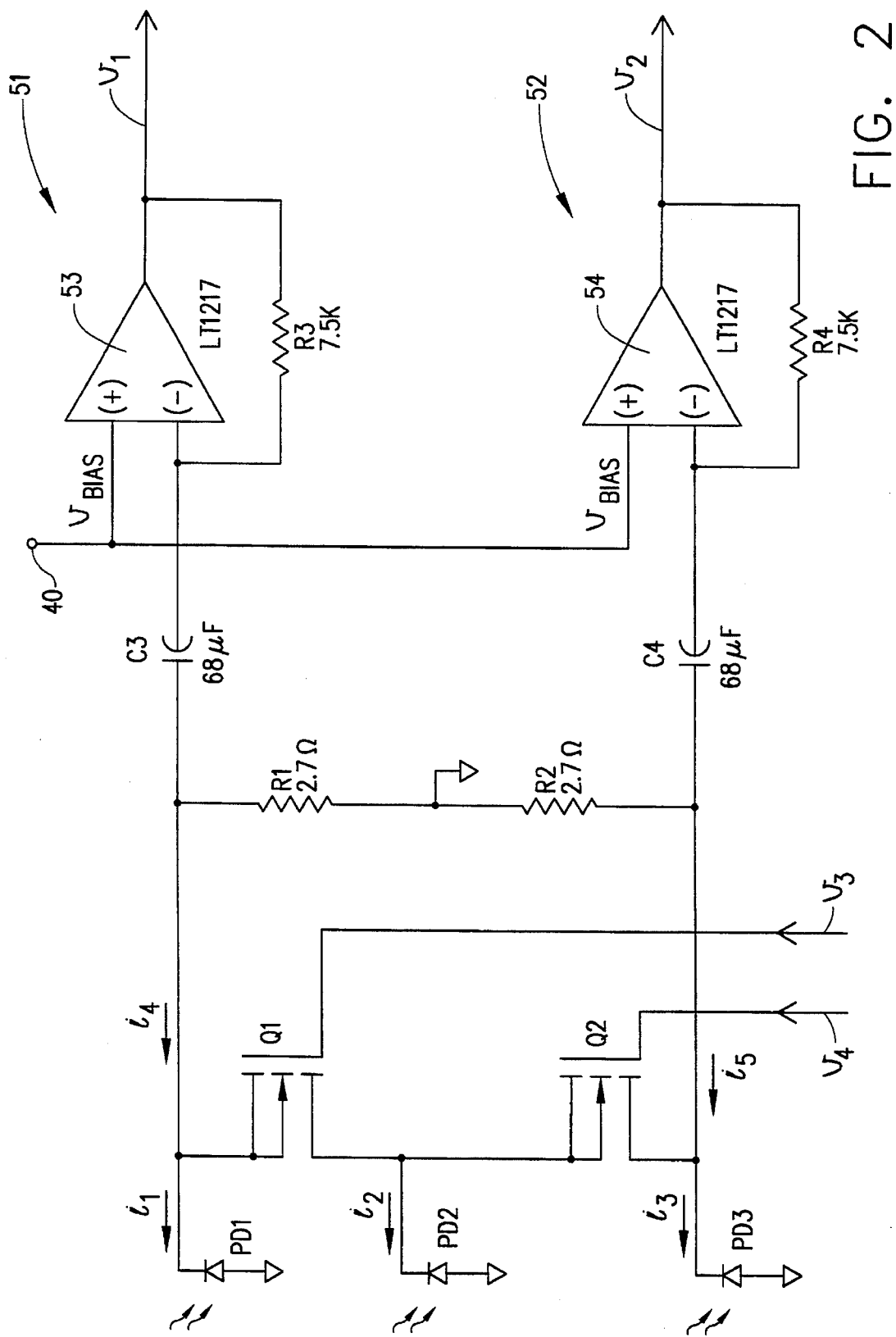
FIG. 2 is a schematic diagram of the light sensors with switching transistors and pulse amplifiers forming two input channels of the laser light detector of FIG. 1.
Figure 7:
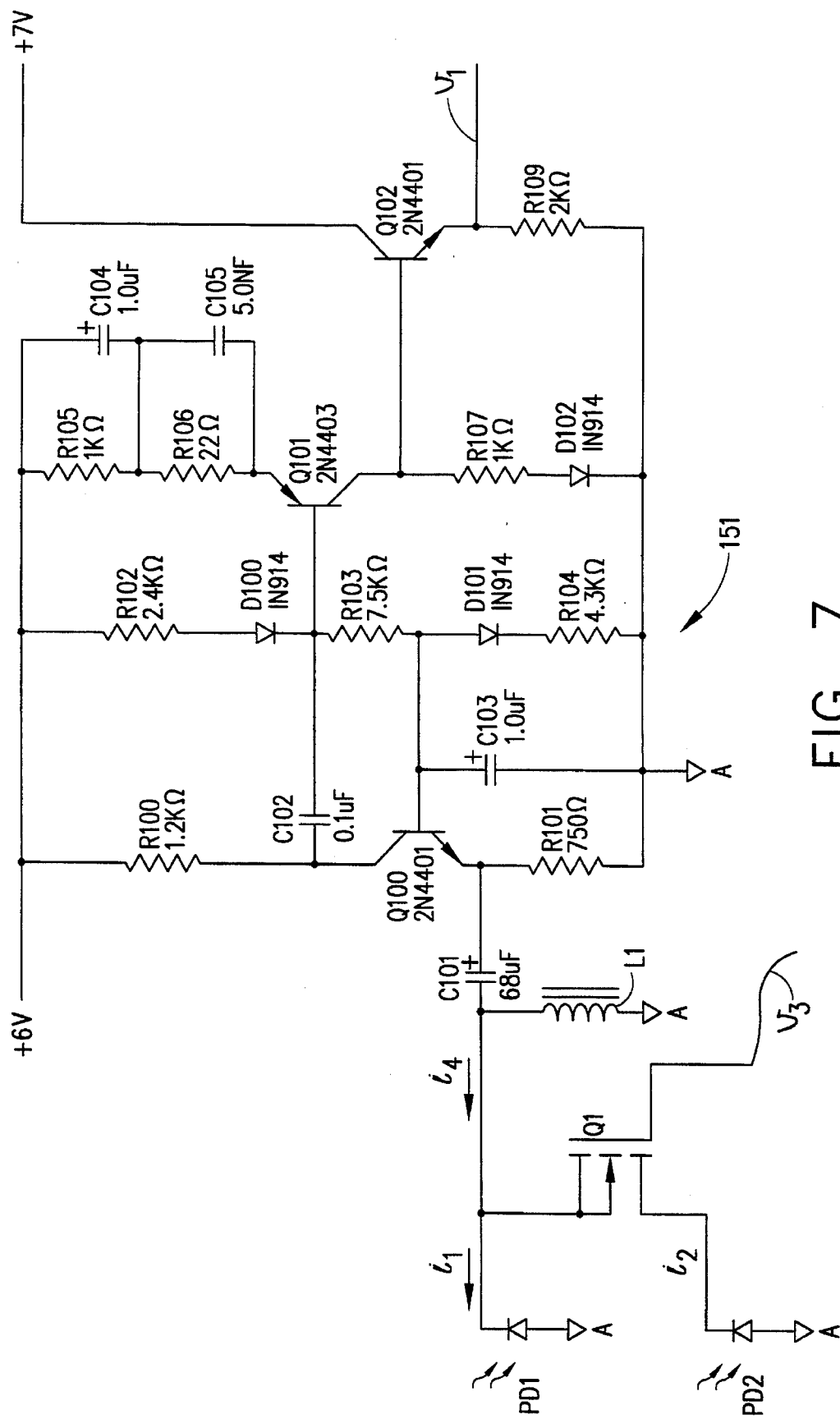
FIG. 7 is a schematic diagram of an alternative laser light sensor and Pulse Amplifier for an input channel of the laser light detector of FIG. 1 which incorporates an inductor.

Concentrating on the first input channel, which is depicted in both FIGS. 2 and 7, measures must be taken to prevent sunlight from swamping out the signal received by the photocells from the rotating laser light source. In FIG. 7, a pulse amplifier 151 includes an inductor L1 which is used to shunt out any direct current $i_1$ and $i_2$ that is produced by sunlight in either photodiode PD1 or PD2 during times when transistor Q1 is switched to its conductive state. Inductor L1 will shunt out only the current $i_1$ generated by photocell PD1 due to sunlight when transistor Q1 is in its off-state. When photocell PD1 (with or without the combination of photocell PD2) receives a laser light signal from the rotating laser light source, the current generated $i_1$ is essentially an AC signal. Since $i_1$ (now $i_4$) is capacitively coupled by capacitor C101, only its AC component is received at the emitter of transistor Q100. As the rotating laser light strikes photodiode PD1, a short pulse of current $i_1$ flows past the source of transistor Q1, at which time it may be combined with a similar current pulse $i_2$ from photocell PD2 which flows through Q1 if in its conducting onstate. Currents $i_1$ and $i_2$ become a combined current $i_4$, which is a short pulse flowing from the emitter of transistor Q100 through capacitor C101 into photocell PD1 (and also photocell PD2 if transistor Q1 is turned on).

Pulse amplifier 151, depicted in FIG. 7, is designed to amplify this current pulse $i_4$ and convert it into a corresponding positive-going voltage pulse $v_1$ at the emitter of Q102. The preferred pulse amplifier circuit is given in FIG. 7, including all component values of the various electrical components, and including the preferred DC voltage supply levels (6 volts and 7 volts DC) on the input and output of the pulse amplifier circuit, respectively. It will be understood that other circuit configurations, or other component values or power supply levels could be used without departing from the principles of the present invention. Laser light detector 50 has two different common points, an analog common "A" and a digital common "D", which are commonly connected but have separate common planes. As can be seen in FIG. 7, the pulse amplifier 151 is connected to analog common A.

If laser light detector 50 includes more than one array of photocells, then each of those arrays would be connected in parallel such that the top-most photocell of the first array is connected in parallel to the top-most photocell of each of the other arrays, all being connected to the source of transistor Q1, and continuing as current $i_4$. Similarly, all of the middle photocells PD2 are connected in parallel so that all of these connections meet where current $i_2$ is indicated on FIGS. 2 and 7, and are connected to the drains of transistors Q1 and Q2. Furthermore, all of the lower-most photocells PD3 are connected in parallel together to join at the source of transistor Q2 and to further continue as a current $i_5$ (as seen on FIG. 2). It will be understood that the overall principles of operation of laser light detector 50 are not affected by the number of arrays of photocells that can receive the rotating laser light.

FIG. 2 depicts an electronic circuit that eliminates the need for an inductor, yet still shunts the direct current produced by sunlight striking photodiode array 94. FIG. 2 shows both channels that are connected through transistors Q1 and Q2 to the three photocells PD1, PD2, and PD3. The operation of transistors Q1 and Q2 in switching these photocells has been described in detail hereinabove. Referring to channel 1, current $i_4$ flows into a coupling capacitor C3, which performs the same function as capacitor C101 in FIG. 7, i.e., it prevents the DC component of $i_4$ from reaching pulse amplifier 51. In a similar fashion, coupling capacitor C4 prevents the DC component of $i_5$ from reaching the pulse amplifier 52.

Inductor L1 has been replaced in channel 1 by resistor R1, which preferably has a value of 2.7 Ω which is approximately equal to the (replaced) inductor's DC resistance. Resistor R1 is known as a shunt circuit, and is designed to properly dispose of the sunlight current. If this is not done properly, the current generated by photocell PD1 will potentially turn on the intrinsic diode of PD1 (which preferably is a photodiode, such as part no. 430A806, manufactured by Silicon Sensors, located in Dodgeville, Wis.), which would then become a low impedance to AC signals. If this occurs, the desired AC signal that would otherwise be generated upon receiving a laser light pulse from the rotating laser light source will be swamped out and shunted through the intrinsic diode. Therefore, using a value of 25 milliamperes of current for $i_1$ in full sunlight, this DC component of $i_1$ (and then of $i_4$) will be forced to travel through R1 which will produce a voltage of 68 millivolts (25 milliAmps×2.70 Ω). This 68 millivolts will act as a forward voltage on the intrinsic photodiode of photocell PD1, which is low enough in magnitude to ensure that the intrinsic diode of photocell PD1 will not conduct.

If the input impedance of pulse amplifier 51 is not much lower than 2.7 Ω, then the signal component (the AC component) of $i_4$ will also travel through resistor R1, and thereby not be sufficient to drive into pulse amplifier 51. Another reason it is desirable to have a low input impedance characteristic for pulse amplifier 51 is that the intrinsic capacitance of photodiode PD1, combined with the external impedance that it sees, tends to make it act as a low-pass filter (an R-C filter). Since it is desirable to have the roll-off point to be as high a frequency as possible, it is preferred to have a low input impedance characteristic for pulse amplifier 51. A typical capacitance for the preferred photodiode used in PD1 is about 20 nF per cell. Since it is desirable for the system to operate in the two megahertz (MHz) region, the maximum input impedance should be no more than 4 Ω for pulse amplifier 51.

To ensure that enough AC signal travels through capacitor C3 and into pulse amplifier 51, it is desirable that the input impedance of pulse amplifier 51 be less than 1/10th of the 2.7 Ω resistance of R1, which is a much more stringent requirement than the 4 maximum input impedance discussed in the paragraph above. With this in mind, it is preferred that a current mode feedback amplifier integrated circuit, designated by the index numeral 53, be used in pulse amplifier 51. Integrated circuit 53 is preferably a part number LT1217, manufactured by Linear Technology Company, located in Milpitas, Calif. The characteristics of this amplifier are a high input impedance at the (+) input terminal and a low input impedance at the (−) input terminal. This low input impedance at the negative input is typically twenty-five (25) Ω. This I.C. chip also has a high gain and a high offset, and it does not exhibit the classical gain-bandwidth roll off, because the bandwidth is relatively independent of the gain. The current feedback architecture allows for the placement of a large capacitor on its input, and coupling capacitor C3 preferably has a value of 68 μF.

To achieve the desired low input impedance, a feedback resistor R3 is used thereby providing a stable high gain, which is termed the transimpedance gain. The minimum specification for this chip's transimpedance (the output voltage divided by the input current at the negative terminal) is given as 500K Ω. To find the loop gain, this 500K Ω minimum transimpedance is divided by the resistance of R3, providing a value of 67 (which is equal to 500K Ω divided by 7.5KΩ). This factor is divided into the 25 Ω typical input impedance for the negative input terminal, and the final result is a maximum input impedance of the entire amplifier circuit 51 of 0.37 Ω. It should noted, however, that the typical transimpedance specification for I.C. 53 is 5M Ω, so that the typical gain (or attenuation) factor is not 67, but 670. Therefore, the typical input impedance of pulse amplifier 51 is 25 Ω divided by 670, which is equal to 0.037 Ω. Since it was desirable to have an input impedance specification for pulse amplifier 51 of a number less than 0.27 Ω, this design achieves that goal by a large tolerance.

The positive input terminal of integrated circuit 53 is connected to a bias voltage $V_{BIAS}$, which is connected to a voltage source at the point designated by index numeral 40. A typical value for $V_{BIAS}$ is 2.0 volts, which would also be applied to the positive input terminal of the second channel's current mode amplifier integrated circuit 54. As can be seen in FIG. 2, current $i_5$ flows into the combination of shunt resistor R2 and coupling capacitor C4, and its AC component further travels into the (−) input terminal of the integrated circuit 54, which forms a pulse amplifier circuit 52. Feedback resistor R4 provides the same characteristics for channel 2 as that provided by R3, as described above, for channel 1. Both pulse amplifiers 51 and 52 produce a voltage output $v_1$ and $v_2$, respectively, at times when these pulse amplifiers receive a current pulse $i_4$ or $i_5$, respectively.

As can be seen in FIG. 1, current $i_4$ is converted into a voltage $v_1$ by pulse amplifier 51, which continues through AC coupling capacitor C1 (and becoming a voltage signal $v_8$) into pulse integrator and automatic gain control circuit 61, which then outputs a voltage level $v_{11}$. Channel 2 has corresponding components that take voltage $v_2$ through AC coupling capacitor C2, thereby producing voltage $v_9$, and into another pulse integrator and automatic gain control circuit 62, which outputs a voltage level $v_{12}$. More such channels of pulse amplifiers and integrators could be added to laser light detector 50 if desirable, however, since this application is merely trying to determine one particular dead band location, only two channels of information are needed at this point. It will be understood that a third pulse amplifier (not shown) and a third integrator/automatic gain control circuit (not shown) could be directly connected to photocell PD2, while eliminating switching transistors Q1 and Q2. By use of such a variation in the circuitry of laser light detector 50, the position of the center of the laser light spot could be determined on each sweep of the rotating laser light source impacting against photodiode array 94, rather than having to wait for two sweeps of the rotating laser light source, as in the depicted circuit of FIG. 1. In this configuration, the center photocell PD2 would preferably have its voltage (representative of the light impacting PD2) added to the voltages output from both photocells PD1 and PD3, respectively, and this would occur after each sweep of the rotating laser light source.

Each of the DC voltage levels $v_{11}$ and $v_{12}$ are individually connected to an analog-to-digital (A/D) converter 70, which is an integral component of a preferred microprocessor (or microcontroller) 78, having a part number PIC16C71, and manufactured by Microchip Technologies, located in Chandler, Ariz.

Capacitor C1 and C2 are DC-blocking capacitors, only allowing the AC component of voltages $v_1$ and $v_2$ to become voltage signals $v_8$ and $v_9$. On the other hand, voltages $v_{11}$ and $v_{12}$ are DC signals, designed to interface directly into A/D converter 70.

The preferred microprocessor (or microcontroller) 78 includes on-board RAM (random access memory), ROM (read only memory), and several parallel input/output ports which are used to communicate to various address, data, and control lines. The microprocessor 78 determines a digital number produced by A/D converter 70, which represents the light energy and duration of the laser light pulse received by the photodiode array 94. This can be determined for each channel individually, thereby providing different numeric values for the light imaging levels represented by voltages $v_{11}$ and $v_{12}$.

Figure 4:
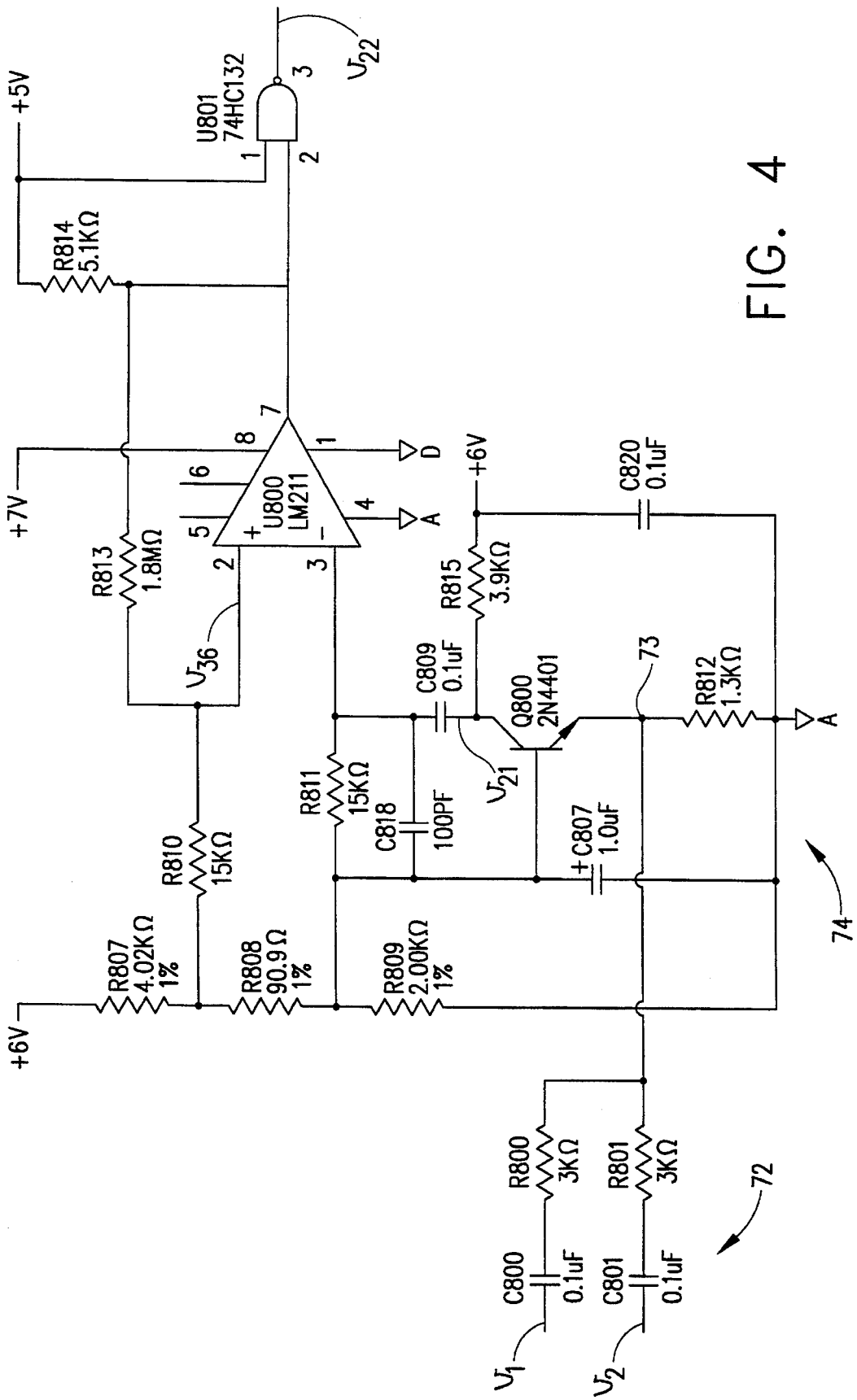
FIG. 4 is a schematic diagram of the voltage Summing Amplifier and voltage Comparator circuit used in the laser light detector of FIG. 1.

Each of the output signals from pulse amplifiers 51 and 52 (signals $v_1$ and $v_2$, respectively) are directed into a voltage summation amplifier 72, which is depicted in detail on FIG. 4. As can be seen on FIG. 4, both voltage signals $v_1$ and $v_2$ are connected in parallel to a node designated by the index numeral 73, which acts as a summing junction for the voltage gain amplifier based on transistor Q800. The summation of voltages $v_1$ and $v_2$ appears at the collector of Q800, and has the designation $v_{21}$.

Both of the voltage input signals $v_1$ and $v_2$ are AC coupled through small capacitors C800 and C801, respectively, and drive into the common base amplifier based upon transistor Q800, which has a low input impedance. Voltage signal $v_{21}$ is also capacitively coupled by C809 into the negative input of voltage comparator U800, which is preferably an integrated circuit manufactured by National Semiconductor of Santa Clara, Calif., having a part number LM211. The threshold voltage $v_{36}$ is established by the +6 VDC power supply in combination with the resistor network of R807, R808, and R809. In the illustrated embodiment, the threshold voltage is approximately 100 millivolts. This comparator circuit based upon U800 also uses a certain amount of hysteresis, which is established by resisters R810 and R813.

The output of U800 is directed into a NAND gate U801, which acts as an inverter and produces a voltage $v_{22}$, which is a digital signal that is maintained at logic 0 if no light beam is touching any of the photodiodes of the photodiode array 94 of laser light detector 50. Once enough light energy is detected by the photodiode array 94, the comparator U800 will change its output state, thereby forcing the NAND gate U801 into its logic 1 state. By use of the summation amplifier 72 and voltage comparator 74 (depicted in FIG. 4), laser light detector 50 measures the total energy of all the photodiodes combined to determine the logic state of $v_{22}$. In the illustrated embodiment, the total amount of current received by all of the photodiodes has a threshold of around 10 microamperes before $v_{22}$ transitions from its logic 0 to its logic 1 state.

Figure 5:
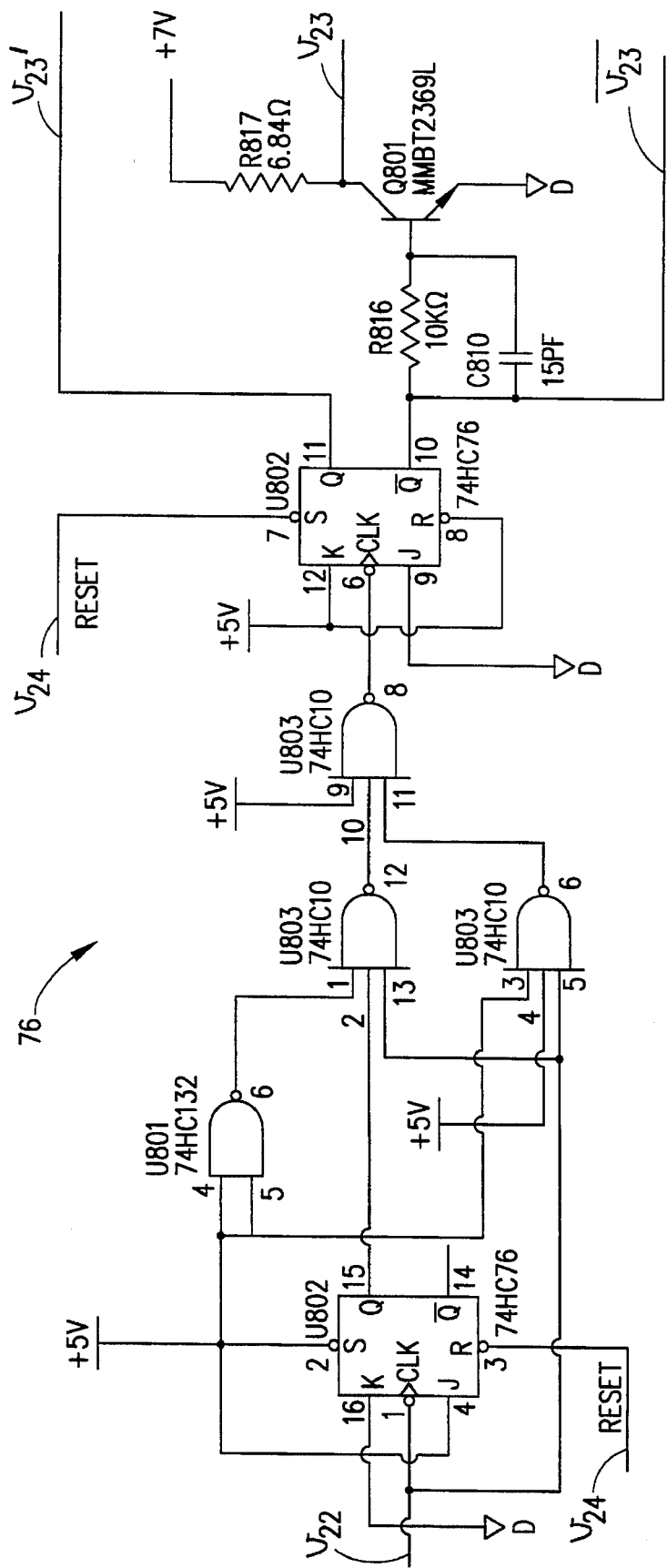
FIG. 5 is a schematic diagram of the Hold Generator circuit used in the laser light detector of FIG. 1.

The output signal of $v_{22}$ from comparator 74 is directed into a Hold Generator 76 which is depicted in detail in FIG. 5. Hold Generator 76 uses two stages of J–K flip-flops and several states of NAND gates to produce "HOLD" signals $v_{23}$ and $v_{23}'$. HOLD signal $v_{23}$ is directed back to each pulse integrator circuit 61 and 62, and HOLD signal $v_{23}'$ is directed to microprocessor 78. HOLD signals $v_{23}$ and $v_{23}'$ both operate in the same manner but have different voltage levels for their logic 0 and logic 1 states.

HOLD signal $v_{23}$ is a digital signal which remains in a logic 1 state while waiting for a light pulse to strike laser light detector 50. Once enough light energy is detected by the photodiodes of laser light detector 50 to force comparator output signal $v_{22}$ to change state, HOLD signal $v_{23}$ remains in its logic 1 state until the end of the light pulse is detected, at which time it will change to its logic 0 state. This occurs when the comparator output signal $v_{22}$ drops back to its logic 0 state. The HOLD signal $v_{23}$ now remains in its logic 0 state until a "RESET" signal $v_{24}$ is received from microprocessor 78. Once this RESET signal is received, the J–K flipflops of Hold Generator 76 are reset to their initial output states, and the HOLD signal $v_{23}$ transitions back to its logic 1 state. As depicted on FIG. 5, there is also an inverted HOLD signal which is given the designation "$\overline{v_{23}}$" on the drawings, and is also referred to as "NOT $v_{23}$". Inverted signal NOT $v_{23}$ is another digital logic signal and is always in the opposite logic state from $v_{23}$.

Figure 3:
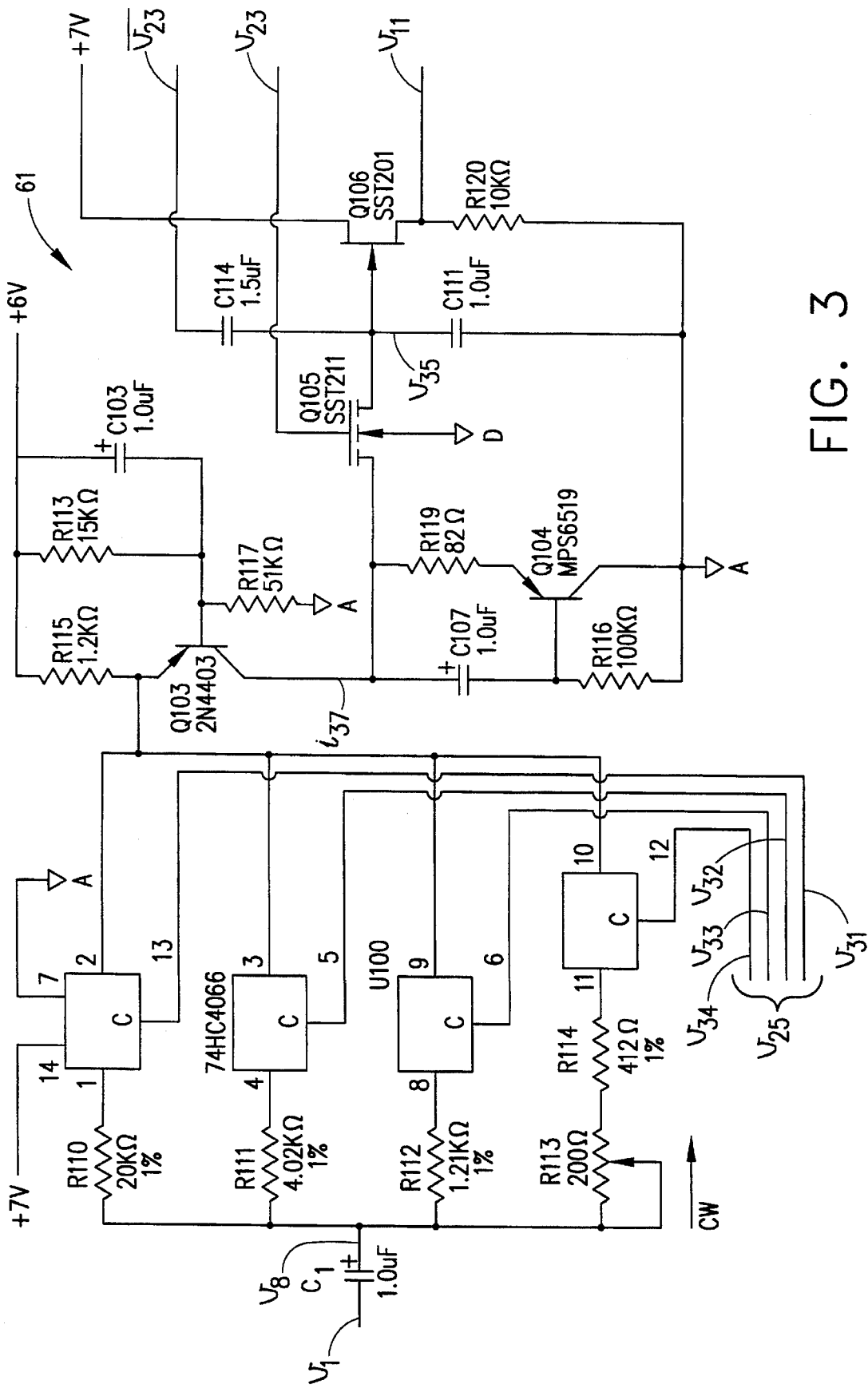
FIG. 3 is a schematic diagram of the Pulse Integrator and Automatic Gain Control circuit of each input channel of the laser light detector of FIG. 1.

The operation of the pulse integrator and automatic gain control circuit 61 (for input channel 1) will now be discussed, while referring to FIG. 3. The pulse amplifier output signal $v_1$ is AC coupled into the pulse integrator and automatic control circuit 61 via capacitor C1, and its AC component continues through C1 as a voltage signal $v_8$. At this point, voltage signal $v_8$ is channelled through one of four analog switches U100, which is preferably a CMOS integrated circuit having the part number 74HC4066 (a four-channel analog switch). The use of analog switch U100 allows the gain of this circuit to be variable, by the use of four different gain resisters R110, R111, R112, and R114. As can be seen in FIG. 3, resistor R114 is combined in series with a potentiometer R113, to create one in-series resistance.

Microprocessor 78 determines which of the analog switches is to be closed by use of its GAIN command signal $v_{25}$, which comprises four individual voltage signals $v_{31}$, $v_{32}$, $v_{33}$, and $v_{34}$. If the highest gain is desired, then $v_{34}$ will be placed in its logic 1 state while signals $v_{31}$ through $v_{33}$ are held in their logic 0 states. If the lowest gain is desired, then $v_{31}$ will be placed in its logic 1 state, while the other three signals are held in their logic 0 states.

In the illustrated embodiment of FIG. 3, the gain ratios are as follows: 1.0 4.97: 16.5: 39.1. It will be understood that different gain values can be chosen depending upon the exact requirements of a given laser light detector. The method of determining which gain is to be chosen by microprocessor 78 will be discussed in detail hereinbelow.

The combination of the four various gain resisters and the four analog switches comprise the input stage for a common base amplifier that is based upon transistor Q103. This common base amplifier is a transconductance amplifier that converts a voltage input signal into a current output signal, and has a high output impedance. The collector of Q103 produces a current signal having the designation $i_{37}$ which includes both the "signal" current due to light pulses striking laser light detector 50, and to "noise" current due to transient noise and solar noise that may have penetrated to this part of the circuit, and additionally includes the quiescent current.

The combination of capacitor C107, resistors R116 and R119, and transistor Q104 comprise a large inductance equivalent which shunts away any DC bias current contained in current signal $i_{37}$. Transistor Q105 is an n-channel field effect transistor (FET) which is either turned on or off by the HOLD signal $v_{23}$, which is connected to the gate input of Q105. As discussed hereinabove, the HOLD signal $v_{23}$ is at a logic 1 state while waiting for a light pulse to occur and during the light pulse's occurrence. Therefore, Q105 is turned on during the same time periods, thereby allowing the portion of current signal $i_{37}$ other than bias current to pass through the drain and source of Q105.

As current signal $i_{37}$ passes through Q105, it tends to charge capacitor C111 with a voltage having the designation $v_{35}$. JFET Q106 is a voltage follower circuit having a high input impedance and a low output impedance. Current signal $i_{37}$, which is charging capacitor C111 I, directly produces voltage $v_{35}$ in the same manner as a classic integrator circuit, and, therefore, when $i_{37}$ is in a positive pulse state, voltage $v_{35}$ will ramp up at a near constant slope.

During the time periods when $i_{37}$ is not in a positive pulse mode (meaning that no light input is being received by laser light detector 50), then the only signal component of $i_{37}$ is a noise component which either charges or discharges capacitor C111, depending on the instantaneous polarity of the noise. Over time, the average integration of noise equals zero, and therefore, the integrator used in this portion of laser light detector 50 provides a much greater signal-to-noise ratio then would otherwise be achieved with mere gain amplification.

Once the signal portion of $i_{37}$ starts to charge capacitor C111, a positive ramp voltage $v_{35}$ begins to ramp up at a slope determined by the magnitude of $i_{37}$. During this positive pulse, the ramping up continues as long as Q105 is turned on, which remains the case as long as the HOLD signal $v_{23}$ remains in its logic 1 state. When the light pulse is no longer detected by comparator 74, HOLD signal $v_{23}$ drops to its logic 0 state, thereby turning off transistor Q105. At this point, capacitor C111's voltage $v_{35}$ remains at its previous level for a long enough time period for its voltage to be measured by the remainder of the circuitry of laser light detector 50.

Since transistor Q106 is part of a voltage follower circuit, it produces an output voltage $v_{11}$ which is equal to voltage $v_{35}$ except for a certain bias offset voltage. The inverted voltage signal NOT $v_{23}$ is used to partially correct the charge which is drawn from C114 through the gate-channel capacitance of Q105 when $v_{23}$ changes state. Since $v_{35}$ is held at a constant voltage after the light pulse disappears, similarly so does voltage $v_{11}$, which is directed to the input of A/D converter 70. Noting the fact that both input channels of the illustrated embodiment of laser light detector 50 are simultaneously sending such voltage signals $v_{11}$ and $v_{12}$ to A/D converter 70, it can be thus seen that microprocessor 78 can determine the precise voltage level of each of the input channels of the photodiode arrays by sequentially sampling the output values provided by A/D converter 70. It will be understood that A/D converter 70 could be a separate integrated circuit with a multiplexed input for $v_{11}$ and $v_{12}$, or there could be a separate A/D converter for each input channel.

Since the time duration that a light pulse is received by the photodiode array of laser light detector 50 is variable, depending upon the distance laser light detector 50 is located from the rotating laser light source, it is important that the voltage signal $v_{35}$ does not saturate as capacitor C111 is charged. The automatic gain control circuit portion of FIG. 3 is used to precisely avoid this problem, under the control of microprocessor 78. Since the gain can be easily controlled in this manner, the pulse integrator and automatic gain control circuit 61 can accommodate a very large pulse width range, typically from as little as 0.5 microseconds to as much as 0.5 milliseconds. By use of this circuit, the dynamic range of the pulse integrator and automatic gain control circuit 61 is at least 30,000 to 1. This is a distinct advantage over any of the prior art, particularly in view of the fact that the signal-to-noise ratio of laser light detector 50 is greatly improved over the prior art circuits.

The functions of microprocessor 78 will now be discussed in detail. As related hereinabove, microprocessor 78 receives a HOLD signal $v_{23}'$ at the end of each received light pulse. After this occurs, microprocessor 78 reads the output values of A/D converter 70 while scanning through both input channels of the illustrated embodiment. After scanning both input channels, microprocessor 78 stores the A/D converter information for each of the channels. Once microprocessor 78 determines whether the center of the laser light spot is on-grade, above grade, or below grade, the microprocessor resets the Hold Generator 76 by outputting a RESET signal $v_{24}$. This sequence of events occurs after laser light detector 50 starts to receive light signals from a rotating laser light source.

When laser light detector 50 is first turned on, and before it starts to receive any laser light signals, microprocessor 78 performs the following initialization functions:

(1) The circuit defaults to the highest gain state, meaning that the high gain command $v_{34}$ is activated to close the analog switch will allow current to pass through resistor R114.

(2) Microprocessor 78 periodically samples the output values of both input channels from A/D converter 70. The numeric value representation of each of these two input channels is then stored in RAM, which allows microprocessor 78 to keep track of the quiescent bias voltage of the integrator circuits 61–62 of each of the input channels.

(3) Microprocessor 78 controls LCD display 80, via signals $v_{26}$, such that no information about the present elevation is displayed on that LCD display. During the time that light pulses are received by laser light detector 50, LCD display 80 will always display some type of grade indication, so that the human operator can ascertain the present elevation as compared to the rotating plane of laser light.

Once the first light beam strikes photodiode array 94, the HOLD signal becomes active (at the end of the light pulse), and microprocessor 78 immediately samples both input channels using A/D converter 70. Each channel is received as a numeric value and the previous quiescent bias level of each channel (which was previously stored in RAM) is subtracted from the new numeric value received from A/D converter 70. This subtraction results in a new net numeric value for each of the input channels, which is used in a "position" calculation, by use of the following preferred equation:

$$R = \frac{K_1 CH_1 + K_2 CH_2}{CH_1 + CH_2} \; ;$$

Where $CH_x$=the net numeric A/D converter value, per input channel;

R =a numeric position result, in the range of $0-1FF_{16}$;

$K_x$=constants which are stored in microprocessor 78.

The above equation calculates a weighted average in which the various constants $K_x$, can be given values that provide a purely linear result, or can provide a different (non-linear) result depending on which options are chosen by the equipment set-up operator. In the illustrated embodiment, constants $K_x$ can be chosen as follows:

$K_1=0, K_2=1FF_{16}$

As can be seen from the above equation and values for constants $K_x$, the minimum numeric value for the position result R is $0_{16}$, and the maximum value is $1FF_{16}$. The various options can affect the way the results are interpreted, which will be discussed in detail hereinbelow. It will be understood that a different equation could be used to calculate a numeric result other than a weighted average without departing from the principles of the present invention.

After the position calculation has taken place, the calculated position R of the laser light strike will be indicated on LCD display 80. This position, however, will probably not be accurate if at least one of the input channels of the A/D converter 70 is saturated. Since the highest gain state is chosen before the first beam strike occurs, it will be quite likely that at least one of these input channels will be saturated.

More accurate data can be displayed after the next laser light strike, using the following procedure: after each of the laser light strikes occurs, microprocessor 78 scans the stored data for each of the A/D channels to determine the maximum numeric value of any one channel, which will be given the designation "X" for this discussion. Since the preferred A/D converter 70 is a 10-bit A/D converter, its numeric output is in the range of $0-1023_{10}$. "Y" is a fixed number in memory (in the computer program stored in ROM) which is just less than the maximum possible number of $1023_{10}$. If X is greater than Y, then microprocessor 78 will reduce the gain state by one step, if possible. Of course, if laser light detector 50 is already at its minimum gain state, then the input circuits will have to continue operating while one or more of the input channels is in a saturated state.

"W" is another fixed number stored in memory (ROM) which is just greater than the minimum possible output value of zero (0) from A/D converter 70. If X is less than W, then microprocessor 78 will increase the gain state by one, if possible. Again, if it is not possible to increase the gain state by one (i.e., laser light detector 50 is already operating at its maximum gain state), then laser light detector 50 will have to continue operating using data which is very low in voltage level.

Any change in gain state, if it occurs, will take place much in advance of the next expected light strike of the photodiode arrays of laser light detector 50. Since most rotating laser light sources operate at 600 rpm, there is typically one hundred milliseconds of time between the expected light pulse receptions.

Since there are only two input channels in the illustrated embodiment of laser light detector 50, microprocessor 78, or at least its A/D converter 70, is not necessarily required to determine the location of the center of the laser light spot impacting upon photodiode array 94. Since the voltage magnitudes of signals $v_{11}$ and $v_{12}$ are directly proportional to the intensity of laser light received at each input channel (which produce current signals $i_4$ and $i_5$, respectively), it is only necessary to determine which voltage signal has the greater magnitude to find the location of the center of the spot of the impacting laser light. A simple voltage comparator (not shown) could be used in determining which signal magnitude is greater, either $v_{12}$ or $v_{12}$. Depending upon which transistor Q1 or Q2 is presently turned on, the comparator would determine whether the laser spot centerline is above or below either gap G1 or gap G2.

In the illustrated embodiment of FIGS. 1 and 8, if Q1 is ON, then the comparator will determine that the laser spot centerline is above gap G2 if $v_{11}>v_{12}$, or the spot centerline is below gap G2 if $v_{11}<v_{12}$. Similarly, if Q2 is ON, then the comparator will determine that the laser spot centerline is above gap G1 if $v_{11}>v_{12}$, or the spot centerline is below gap G1 if $v_{11}<v_{12}$.

A keypad 84 is used to choose the various options available in laser light detector 50, using signals $v_{28}$ that are received by microprocessor 78. Some of the options are to provide indications such as low battery, laser transmitter out of level, speaker on or off. The status of each of these options is displayed on liquid crystal display 82 which is controlled by microprocessor 78 via signals $v_{27}$.

Laser light detector 50 includes a speaker 48 that is activated by voltage signal v5 controlled by microprocessor 78. The signal passes through digital inverters 44, 45, and 46, providing signals $v_6$ and $v_7$. Speaker 48 is preferably used to indicate whether or not the laser light spot centerline is on-grade with respect to the laser light detector 50. For example, the speaker 48 can "beep" at a "fast" rate when laser light detector 50 is above grade, a "slow" rate when laser light detector 50 is below grade, and a continuous tone when laser light detector 50 is on-grade.

In addition, speaker 48 can be used to indicate that the laser light source is out-of-level. The rotating light source typically sweeps at a rate of 600 RPM (revolutions per minute). However, if the light source detects that it is out-of-level, then its sweep rate typically falls to 300 RPM. Laser light detector 50 will notice this slower sweep rate, and speaker 48 will preferably output a tone of a different frequency than normal, or will "beep" at a much slower rate. In addition, indicator 86 of liquid crystal display 82 would also provide a visual indication of this problem.

As related above, speaker 48 can be deactivated by use of a keypad command, and its activated or deactivated status is indicated by liquid crystal display 82 (at index numeral 87). In some applications, it is desirable to have the audible output of speaker 48 to be quite loud, and a typical low voltage AC or DC SONALERT™ is provided having a very loud output value. On the other hand, in indoor environments, the loud audio output would preferably be attenuated to a much lower audible level, and laser light detector 50 can be optionally provided with a tuned cavity 98 that has a resonant frequency equal to the normal audio frequency of speaker 48. If an attenuated audio output is desired, then the frequency of the audio signal at voltages $v_6$ and $v_7$ can be significantly increased or decreased, thereby causing speaker 48 to operate at a frequency that is not within the resonant frequency of tuned cavity 98, which has the effect of greatly attenuating the sound level output from laser light detector 50. In this manner, laser light detector 50 can be used both indoor and outdoors, and this selection can be made without the need for any moving parts. The selection can be made through keypad 84, and its indication would be visible at index numeral 88 on liquid crystal display 82.

It will be understood that the above-described options are merely examples of some of the features that can be provided for laser light detector 50. Many other options can be added to the circuit of laser light detector 50 without departing from the principles taught by the present invention.

As is common in electronic circuits, a multi-voltage DC power supply 90 is provided with laser light detector 50. This DC power supply can be hooked into the battery 92 of the equipment that laser light detector 50 is attached to. If a cable-less installation is desired, then DC power supply 90 can run on its own internal batteries.

An optional physical layout of the photocells of the photodiode array is depicted in FIG. 9 in which there are two large photocells PD4 and PD7, and two much smaller photocells PD5 and PD6. All four of these photocells are positioned so that the large photocells PD4 and PD7 are at the outer extremes and the smaller photocells PD5 and PD6 are between the two larger photocells. As seen in FIG. 9, all four of these photocells are essentially co-linear and have a common vertical centerline.

Each photocell is preferably a silicon photodiode and the length and width dimensions of photocells PD4 and PD5 are preferably 0.2 inches (5.1 millimeters) by 0.8 inches (20.3 millimeters), while the central smaller photodiodes PD5 and PD6 preferably have dimensions of 0.1 inches (2.5 millimeters) by 0.2 inches (5.1 millimeters). These photodiodes are precisely positioned so that a gap is formed between each pair of these photocells, providing gaps G3 between the lower edge of photocell PD4 and the upper edge of photocell PD5, G4 between the two smaller photocells PD5 and PD6, and a lower gap G5 between the lower edge of photocell PD6 and the upper edge of photocell PD7. The preferred sizes for photocells PD4 and PD7 are determined in view of the range of laser light spot sizes typically found on construction jobsites.

The preferred dimension of gaps G3, G4 and G5 are in the range between 0.025 inches (0.6 millimeters) and 0.050 inches (1.3 millimeters). The photodiode array of FIG. 9 can be used to provide a variable dead band, which depends upon which of the smaller photocells PD5 and PD6 are connected to the larger photocells PD4 and PD7 during particular sweeps of the laser light source. For example, a more narrow dead band indicated on FIG. 9 by the dimension DB2 can be created by connecting photocell PD5 to photocell PD4 upon the first sweep, and by turning photocell PD6 OFF during that sweep. During the second sweep, photocell PD5 is turned OFF and photocell PD6 is connected to photocell PD7. It will be understood that these connections between photocells are provided by switching transistors that are not shown on the drawings. A new transfer function will be created by this switching of these smaller photocells, and in this example, the symbol "A" represents the amount of power of the light beam striking the upper photocell PD4, the symbol "B" represents the amount of power of light striking the smaller photocell PD5, the symbol "C" represents the amount of power of light striking the other small photocell PD6, and the symbol "D " represents the amount of power of light striking the bottom photocell PD7.

In this configuration, the transfer function during the first sweep of laser light is equal to the equation: $[(A+B)-D] \div (A+B+D)$. After this first sweep occurs, the switching transistors (not shown) are transfer state to create a new connection for the second sweep, described above, in which the transfer function is the equation: $[A-(C+D)] \div (A+C+D)$. Regarding the first sweep of laser light, laser light detector 50 can determine whether or not the center of the laser light spot is above or below the line passing through the photocell PD6, indicated on FIG. 9 by the lower of the two dashed lines corresponding to the dead band DB2. During the second sweep, laser light detector can determine whether or not the center of the laser light spot is above or below a line passing through photocell PD5, indicated on FIG. 9 by the upper dashed line of dead band DB2. By this arrangement, a somewhat narrow dead band DB2 is effectively implemented.

By simply varying the mode of the electronics provided in laser light detector 50, the same photodiodes of FIG. 9 can be utilized to implement a larger dead band DB3. In this circumstance, the two smaller photocells PD5 and PD6 are both switched to be combined with photocell PD4 during the first sweep of the laser light source. After that has occurred, the switching transistors (not shown) reconfigure the photodiode array such that the two smaller photocells PD5 and PD6 are electrically connected to the photocell PD7. This creates a new transfer function as follows: during the first sweep of laser light, the transfer function is: $[(A+B+C)-D] \div (A+B+C+D)$. During the second sweep, the transfer function is: $[A-(B+C+D)] \div (A+B+C+D)$.

In this case, during the first sweep of laser light, laser light detector 50 can determine whether or not the center of the laser light spot is above or below the lower gap G5. During the second sweep, laser light detector 50 can determine whether or not the center of the laser light spot is above or below the upper gap G3. This implements a larger dead band DB3 using the same photodiode array depicted on FIG. 9.

It will be understood that many different dead bands can be implemented on a single photodiode array if there are several different large and small photocells utilized within that photodiode array. For example, if three small photodiodes were centered between two large photodiodes, then a smaller dead band could be achieved along the top and bottom edges of the very center small photodiode and a larger dead band could be achieved along the bottom edge of the top large photocell and the top edge of the bottom large photocell. In addition, many other combinations of the smaller photocells could be utilized to create other dead bands in this configuration. In addition, a split cell diode could be utilized to achieve a smoother transfer function. In another configuration, a Chevron cell photodiode array could be used to provide a Gaussian spot distribution, which may also have the added benefit of correcting for "uniform spot" problems by linearizing the transfer function. In another configuration, small photocells could be interdigitated like interlocking fingers that are switched in and out during the various sweeps by the laser light source.

Laser light detector 50 can be used with configurations and hardware other than described hereinabove. For example, instead of being provided with a liquid crystal display 82, the symbols of liquid crystal display 82 could be formed of LEDs or incandescent lights. In addition, the battery 92 need not be provided if the laser light detector 50 is to be permanently mounted onto a machine, such as a bulldozer.

Another configuration of laser light detector 50 is to use voltage comparators instead of an A/D converter to determine the null points of the dead band edges, as described hereinabove. It should be noted that the use of comparators instead of the A/D converter and a microprocessor would make it more difficult to compensate for the initial quiescent integrator conditions. Of course, the comparator configuration would be less expensive to produce, and could still be used in conjunction with a microprocessor that would still control the display and the switching of the transistors Q1 and Q2 of the photodiode array 94. On the other hand, the microprocessor itself could be eliminated if digital logical were substituted. One way of implementing such digital logical would be to use programmable logic state integrated circuits. Such digital logic could control the switching of the transistors Q1 and Q2 as well as controlling LCD display 82 and LCD display 80. In fact, with enough digital logic, all of the functions normally controlled by the microprocessor could be implemented.

Laser light detector 50 could use a different amplifier configuration for the pulse amplifiers 51 and 52. As described hereinabove, the key element of pulse amplifiers 51 and 52 is a current mode feedback amplifier integrated circuit. This amplifier exhibits a low input impedance and has a transimpedance gain, which is controlled by a feedback resistor, such as resistor R3. As an alternative, a voltage amplifier could be used for pulse amplifier 51, or a non-feedback transimpedance amplifier could be used. The most important operating characteristics of such an amplifier would be a low input impedance and a stable gain.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

I claim:

1. A light detecting circuit, comprising:

(a) a plurality of light-sensitive elements arranged in an array for detecting pulses of light energy striking said light detecting circuit, thereby creating a plurality of first electrical signals, wherein the magnitude of each of said plurality of first electrical signals is proportional to the power of light striking its corresponding light-sensitive element, each of the light-sensitive elements in said array having a known physical location with respect to one another, and each pair of adjacent light-sensitive elements forming an individual gap of known distance between the respective proximal edges of said pair of adjacent light-sensitive elements;

(b) at least one electrical switching device that alternately connects one of said plurality of first electrical signals to at least one of the other of said first electrical signals, thereby creating at least two interface signals;

(c) an amplifying and integrating circuit that amplifies and integrates each of said at least two interface signals, thereby creating a plurality of second electrical signals, wherein the gain of said amplifying and integrating circuit is automatically controlled so as to keep said plurality of second electrical signals within the active dynamic range of said light detecting circuit, and wherein the peak magnitude of each of said plurality of second electrical signals is proportional to the power and to the duration time of light striking its corresponding light-sensitive element;

(d) a comparator device that determines which of said plurality of second electrical signals is greater in magnitude, said greater second electrical signal being indicative of the physical location that substantially the center of said light energy is striking said array of light-sensitive elements; and (e) a display for indicating said actual physical location, in comparison to the desired physical location, that substantially the center of said light energy is striking said array of light-sensitive elements.

2. A light detecting circuit, comprising:

(a) a plurality of light-sensitive elements arranged in an array for detecting pulses of light energy striking said light detecting circuit, thereby creating a plurality of first electrical signals, wherein the magnitude of each of said plurality of first electrical signals is proportional to the power of light striking its corresponding light-sensitive element, each of the light-sensitive elements in said array having a known physical location with respect to one another, and each pair of adjacent light-sensitive elements forming an individual gap of known distance between the respective proximal edges of said pair of adjacent light-sensitive elements;

(b) an amplifying and integrating circuit that amplifies and integrates each of said plurality of first electrical signals, thereby creating a plurality of second electrical signals, wherein the gain of said amplifying and integrating circuit is automatically controlled so as to keep said plurality of second electrical signals within the active dynamic range of said light detecting circuit, and wherein the peak magnitude of each of said plurality of second electrical signals is proportional to the power and to the duration time of light striking its corresponding light-sensitive element;

(c) at least one summing device that sums at least one of said second electrical signals to one of the other of said second electrical signals, thereby creating at least two interface signals;

(d) a comparator device that determines which of said at least two interface signals is greater in magnitude, said greater interface signal being indicative of the physical location that substantially the center of said light energy is striking said array of light-sensitive elements; and (e) a display for indicating said actual physical location, in comparison to the desired physical location, that substantially the center of said light energy is striking said array of light-sensitive elements.

3. A light detecting circuit, comprising:

(a) three light-sensitive elements arranged in an array for detecting pulses of light energy striking said light detecting circuit, thereby creating three electrical input signals corresponding to said three light-sensitive elements, wherein the magnitude of each of said input signals is proportional to the power of light striking the surface of its corresponding light-sensitive element, each of the light-sensitive elements in said array having a known physical location with respect to one another, wherein the second light-sensitive element is positioned between the first and third light-sensitive elements, said first light-sensitive element having a greater light-sensitive area than that of said second light-sensitive element and said third light-sensitive element having a greater light-sensitive area than that of said second light-sensitive element, a first gap of known distance being formed between the respective proximal adjacent edges of said first and second light-sensitive elements and a second gap of known distance being formed between the respective proximal adjacent edges of said second and third light-sensitive elements;

(b) a plurality of electronic switching devices that alternately connect the second input signal corresponding to said second light-sensitive element to one of said first and third input signals corresponding, respectively, to said first and third light-sensitive elements, thereby creating two interface signals, the first of said interface signals having a magnitude that relates to only said first input signal during a first time interval during which a first pulse of light energy strikes said light detecting circuit, the first of said interface signals having a magnitude that relates to the sum of both said first and second input signals during a second time interval during which a second pulse of light energy strikes said light detecting circuit, and the second of said interface signals having a magnitude that relates to only said third input signal during said second time interval, the second of said interface signals having a magnitude that relates to the sum of both said second and third input signals during said first time interval;

(c) a plurality of amplifying and integrating circuits that amplify and integrate each of said first and second interface signals, thereby creating two electrical output signals, wherein the gain of said amplifying and integrating circuits is automatically controlled so as to keep said output signals within the active dynamic range of said light detecting circuit, and wherein the peak magnitude of each of said output signals is proportional to the power and to the duration time of light striking its corresponding light-sensitive element;

(d) a comparator device that determines which of said two output signals is greater in magnitude during each of said first and second time intervals, thereby determining the physical location that substantially the center of said light energy is striking said array of light-sensitive elements as compared to said first and second gaps; and (e) a display for indicating said actual physical location, in comparison to said first and second gaps, that substantially the center of said light energy is striking said array of light-sensitive elements.

4. The light detecting circuit as recited in claim 3, wherein the distance between the centerlines of said first and second gaps is the dead band of said light detecting circuit.

5. The light detecting circuit as recited in claim 3, wherein said comparator device comprises an analog-to-digital converter and a microprocessor.

6. The light detecting circuit as recited in claim 3, further comprising a fourth light-sensitive element having a known physical location with respect to the other said three light-sensitive elements, said fourth light-sensitive element having a light-sensitive area that is substantially equal to that of said second light-sensitive element, said fourth light-sensitive element being positioned between said second and third light-sensitive elements thereby creating an additional, third gap of known distance formed between the respective proximal adjacent edges of said second and fourth light-sensitive elements, wherein said second gap is located between the respective proximal adjacent edges of said fourth and third light-sensitive elements, said fourth light-sensitive element creating a fourth electrical input signal having a magnitude that is proportional to the power of light striking its surface; wherein said plurality of electronic switching devices alternately connect at least one of said second and fourth input signals to one of said first and third input signals, thereby creating said two interface signals, the first of said interface signals having a magnitude that relates to only said first input signal during said first time interval, the first of said interface signals having a magnitude that relates to the sum of both said first and at least one of said second and fourth input signals during said second time interval, and the second of said interface signals having a magnitude that relates to only said third input signal during said second time interval, the second of said interface signals having a magnitude that relates to the sum of both said third and one of said second and fourth input signals during said first time interval; wherein said comparator circuit determines the physical location that substantially the center of said light energy is striking said array of light-sensitive elements as compared to said first, second, and third gaps; and wherein said display indicates said actual physical location, in comparison to said first, second, and third gaps, that substantially the center of said light energy is striking said array of light-sensitive elements.

7. The light detecting circuit as recited in claim 6, further comprising a mode select switch that determines which distance is chosen of a variable dead band for the operation of said light detecting circuit.

8. A light detecting circuit, comprising:

(a) three light-sensitive elements arranged in an array for detecting pulses of light energy striking said light detecting circuit, thereby creating three electrical input signals corresponding to said three light-sensitive elements, wherein the magnitude of each of said input signals is proportional to the power of light striking the surface of its corresponding light-sensitive element, each of the light-sensitive elements in said array having a known physical location with respect to one another, wherein the second light-sensitive element is positioned between the first and third light-sensitive elements, said first light-sensitive element having a greater light-sensitive area than that of said second light-sensitive element and said third light-sensitive element having a greater light-sensitive area than that of said second light-sensitive element, a first gap of known distance being formed between the respective proximal adjacent edges of said first and second light-sensitive elements and a second gap of known distance being formed between the respective proximal adjacent edges of said second and third light-sensitive elements;

(b) a plurality of amplifying and integrating circuits that amplify and integrate each of said first, second, and third input signals, thereby creating three electrical output signals, wherein the gain of said amplifying and integrating circuits is automatically controlled so as to keep said output signals within the active dynamic range of said light detecting circuit, and wherein the peak magnitude of each of said output signals is proportional to the power and to the duration time of light striking its corresponding light-sensitive element, said first electrical output signal corresponding to said first light-sensitive element, said second electrical output signal corresponding to said second light-sensitive element, said third electrical output signal corresponding to said third light-sensitive element;

(c) at least one electronic summing device that sums said second output signal to both of said first and third output signals, thereby creating a plurality of interface signals, the first of said interface signals having a magnitude that relates to only said first input signal, the second of said interface signals having a magnitude that relates to the sum of both said first and second input signals, the third of said interface signals having a magnitude that relates to only said third input signal, and the fourth of said interface signals having a magnitude that relates to the sum of both said second and third input signals, said plurality of interface signals being created upon each occurrence of a pulse of light energy striking said light detecting circuit;

(d) at least one comparator device that determines which of said interface signals is greater in magnitude between said first and fourth interface signals, and which of said interface signals is greater in magnitude between said second and third interface signals, thereby determining the physical location that substantially the center of said light energy is striking said array of light-sensitive elements as compared to said first and second gaps; and (e) a display for indicating said actual physical location, in comparison to said first and second gaps, that substantially the center of said light energy is striking said array of light-sensitive elements.

9. The light detecting circuit as recited in claim 8, wherein the distance between the centerlines of said first and second gaps is the dead band of said light detecting circuit.

10. The light detecting circuit as recited in claim 8, wherein said at least one comparator device comprises an analog-to-digital converter and a microprocessor.

* * * * *